United States Patent [19]

Forbes et al.

[11] 3,864,273

[45] Feb. 4, 1975

[54] PROCESS FOR RECLAIMING RARE-EARTH PHOSPHORS

[75] Inventors: Ronald G. Forbes, Kirtland; Michael Turjanica, Lyndhurst, both of Ohio

[73] Assignee: General Electric Company, Schenectady, N.Y.

[22] Filed: Nov. 13, 1972

[21] Appl. No.: 305,957

[52] U.S. Cl. .................. 252/301.4 R, 252/301.4 S
[51] Int. Cl. ........ C09k 1/10, C09k 1/14, C09k 1/44
[58] Field of Search... 252/301.4 R, 301.4 S, 301.6 S

[56] References Cited
UNITED STATES PATENTS

| | | | |
|---|---|---|---|
| 3,474,040 | 10/1969 | Hedler et al. | 252/301.4 R |
| 3,523,904 | 8/1970 | Single | 252/301.4 R |
| 3,575,878 | 4/1971 | Mehalchick | 252/301.4 R |
| 3,577,351 | 5/1971 | Dodds | 252/301.4 R |
| 3,763,050 | 10/1973 | Dikhoff et al. | 252/301.4 R |

Primary Examiner—Jack Cooper
Attorney, Agent, or Firm—John F. McDevitt; Lawrence R. Kempton; Frank L. Neuhauser

[57] ABSTRACT

A process is described to reclaim a variety of rare-earth phosphors that have been contaminated by combination with other phosphors used in the manufacture of color television cathode ray tubes. The process also removes the organic binder used in such manufacture so that a reclaimed phosphor has physical and behavior characteristics substantially equivalent to the original phosphor material and without rebuilding or other complicated processing steps being needed. The essential steps in the present consist of heating the contaminated phosphor to volatilize the organic binder which is followed by a liquid treatment to solubilize the sulfide phosphor contaminants for subsequent physical separation from the phosphor being reclaimed.

10 Claims, No Drawings

PROCESS FOR RECLAIMING RARE-EARTH PHOSPHORS

BACKGROUND OF THE INVENTION

This invention relates to the reclaiming of various europium-activated rare-earth phosphors including yttrium and gadolinium oxides as well as mixtures thereof, yttrium vanadate, and yttrium oxysulfide. More particularly, the present invention deals with a novel reclamation process which restores a europium-activated rare earth phosphor to its original condition by physical separation from the other phosphors and organic binder utilized in the manufacture of color television cathode ray tubes. Specifically, the present process recovers the original phosphor from the aforementioned contaminants without any necessity of dissolving and rebuilding the phosphor which takes place in most of the prior art processes.

For the manufacture of color television cathode ray tubes, a three component phosphor system is generally used. As is well-known, the three phosphors are red, green, and blue emitting phosphors and the red phosphor now in general use, is a europium-activated rare-earth phosphor which is generally reclaimed from unsatisfactory manufacture by reason of its cost. The restoration of the rare-earth phosphor to its original condition entails removal of the organic binder along with the blue phosphor which is generally zinc sulfide and the green phosphor which is generally zinc-cadmium sulfide. The prior art processes have generally adopted a recovery approach which includes dissolving the rare-earth phosphor in one or more mineral acids and thereafter precipitating the rare-earth values as mixed oxalates. The organic binder is removed in these prior art processes by sufficient heating of the contaminated mixture although such heating has also been employed after the color contaminants have been removed. When reclaiming the phosphor by a method which includes dissolving and precipitation of the rare-earth values, it should also be appreciated that additional heating is required to convert the precipitated products to the final phosphor composition.

A different process for recovery of a rare-earth oxide phosphor which has been contaminated with sulfide phosphors and which does not require rebuilding of the phosphor is also known. In this method, a mixture of the contaminated phosphor with an ammonium halide is heated to a temperature of at least about 1000°C in an oxidizing atmosphere for a sufficient time period to volatilize the reaction products therein produced. When ammonium chloride is employed in this process, it is recommended that the product be subsequently refired to about 1100°C for complete removal of residual halide ion. Understandably, such a process could not be used for recovery of a rare-earth oxysulfide phosphor by reason of the heating conditions being employed.

SUMMARY OF THE INVENTION

The applicants have discovered a novel process which is generally useful for recovery of the principal rare-earth phosphors used in color television cathode ray tube manufacture. Generally, the present process entails heating the contaminated phosphor under oxidizing conditions sufficient to volatilize the organic binder which is present, thereafter slurrying the phosphor in a heated liquid solution of a soluble hypochlorite compound to convert the phoshpor sulfide contaminants to partially soluble oxygen compounds, completely dissolving said conversion products by reaction with a soluble ammonium complexing agent and finally physically separating the phosphor from the liquid reaction medium. The preliminary heating of the phosphor to volatilize the organic binder can be conducted in air at elevated temperatures in the range 300°C–900°C depending upon the phosphor chemical composition with lower temperatures being employed for rare-earth oxysulfide phosphors so as not to thermally decompose the phosphor being reclaimed. The chemical conversion and subsequent solubilization of the sulfide phosphor contaminants is carried out according to the present process while the phosphor is suspended in a liquid slurry and under heating conditions precluding any formation of insoluble reaction products. In the preferred embodiments hereinafter described, the removal of solubilization of the converted sulfide contaminants is carried out in a multi-step fashion which permits additional removal of residual chloride ion from the liquid reaction medium.

DESCRIPTION OF THE PREFERED EMBODIMENTS

As above generally recited, the present process is generally used for recovery of a variety of rare-earth phosphors which have been contaminated with organic binder and zinc sulfide or zinc cadmium sulfide phosphors during color television cathode ray tube manufacture. The decontaminated phosphors obtained in accordance with this process have been found equivalent in color, electrical conductivity, brightness, and physical form compared with the original rare-earth phosphor. Additionally, the present process involves no significant dissolving of the rare-earth phosphor, hence enables recovery of 96% yields or greater of the rare-earth phosphor. The present process has also been found readily adaptable to the conventional equipment used in rare-earth phosphor manufacture and within the criteria of operating conditions above recited, it is also capable of being easily and simply carried out.

According to the invention, the contaminated rare-earth phosphor to be recovered is preliminarily heated under oxidizing conditions to elevated temperatures preferably in the range 450°C–550°C which has proven adequate to thermally decompose and volatilize the commonly employed polyvinyl alcohol binder used in television screen manufacture without degrading the rare-earth phosphor. Such heating of the contaminated phosphor mixture in air has also proven adequate to remove the organic binder in a time period of one hour depending upon the heating temperature involved and such other conditions as circulation of the oxidizing atmosphere during the heating period. Removal of the organic binder in this manner may also be enhanced if the binder is soluble, by initial suspension of the contaminated phosphor mixture in a liquid solvent for the organic binder which can be water in the case of a polyvinyl alcohol binder prior to the thermal oxidation. Such initial dispersion of the phosphor mixture in a liquid solvent for the binder further serves as a means to physically separate extraneous contamination such as glass chips and other foreign matter from the phosphor mixture by sieving or by known liquid settling or flotation principles. The suspended phosphor mixture can thereafter be recovered by centrifuging and drying for subsequent treatment in accordance with the present invention.

The conversion and subsequent solubilization of sulfide phosphor contaminants is carried out by liquid treatment in a manner which avoids formation of insoluble conversion products in the liquid phosphor slurry. More particularly, the contaminated phosphor mixture is first suspended as a uniform dispersion in a liquid which can be water to provide a suitable reaction medium for conversion and solubilization of the sulfide phosphor contaminants. Whereas the specific chemical reactions which take place during conversion and solubilization of these contaminants in a liquid reaction medium is not precisely known at the present time by reason of the amphoteric nature of the zinc and/or cadmium ions involved and which can lead to a number and variety of possible reaction products being formed, it is believed that certain general reactions take place in order to effect removal of these ions. In further explanation, the zinc and/or cadmium sulfide contaminants are reacted in the liquid medium with a suitable hypochlorite compound such as sodium hypochlorite or calcium hypochlorite under proper heating conditions to form partially soluble oxygen compounds of these metal ions as oxides and/or hydroxides. In order to physically separate these partially soluble conversion products from the phosphor slurry, it becomes further necessary to completely dissolve these conversion products in the liquid phase of the reaction medium. Accordingly, the initial conversion products are completely solubilized by a further chemical mechanism of reaction with a suitable ammonium complexing agent in the reaction medium under different heating conditions. The final conversion permits physical separation thereafter of the phosphor solids from the liquid phase of the reaction medium.

The initial chemical conversion employing an aqueous slurry of the contaminated phosphor can be carried out at temperatures in the range 80°C–90°C with these temperatures being maintained for approximately one hour after addition of a 15% sodium hypochlorite solution to the slurry. The rate at which the phosphor slurry is heated during this step is important to avoid excess foaming of the slurry if the residual binder is of a type such as polyvinyl alcohol which has dispersant or emulsifying properties. Excessive foaming impedes subsequent physical separation of the decontaminated phosphor from the liquid reaction medium. Heating said reaction medium above 90°C has also been found on occasion to result in formation of conversion products which cannot readily be solubilized thereafter in accordance with the present invention. After initial conversion of the sulfide phosphor contaminants in the aforegoing manner, it is also preferred to wash the phosphor solids free of residual chloride ion prior to complete solubilization of the conversion products. Specifically, the phosphor solids can be physically separated from the liquid reaction medium by decantation or other known conventional techniques such as centrifuging and then washed with deionized water until no residual chloride ion is found. The phosphor solids can then be reslurried in water to provide a suitable liquid reaction medium for complete solubilization of the conversion products which still remain. The complete solubilization of the oxygen compounds is conducted at temperatures of about 25°C or lower to further avoid any significant formation of insoluble zinc or cadmium compounds in the reaction mixture. The desired result is believed attributable to a formation of ammonium complex products with the particular metal ions and can be carried out simply by adding a saturated aqueous solution of a suitable ammonium complexing agent such as ammonium chloride or ammonium hydroxide to the phosphor slurry. Alternately, the centrifuged phoshor slurry which is obtained after removal of residual chloride ion can be reslurried at room temperature in the saturated aqueous solution of a suitable ammonium complexing agent with mechanical agitation for a time period of one-half hour in order to effect a complete solubilization. The phosphor solids can thereafter be allowed to settle in the reaction vessel for separation from the supernatant liquid and removal of any residual complexing agent by conventional means. The recovered phosphor can then be finally treated by other conventional means such as by drying and sifting to provide a reclaimed product exhibiting equivalent characteristics to the virgin material.

The following examples are provided to further illustrate practice of the present invention with all parts, proportions, and percentages being given by weight unless otherwise specified.

EXAMPLE I

Approximately one (1) kilo of europium-activated yttrium oxysulfide phosphor which had been contaminated with conventional amounts of a polyvinyl alcohol binder and residual quantities of zinc sulfide phosphor as well as zinc cadmium sulfide phosphor was loaded in shallow quartz trays to a depth of approximately 1 inch and admitted to a circulating air oven being held at 450°C–500°C. After approximately 1 hour of heating in this manner, the phosphor material was removed from the oven and allowed to cool. The phosphor powder was then passed through a 10 mesh screen of stainless steel to remove any foreign objects that could damage the glassed processing equipment thereafter used in the reclamation process. The sieved phosphor was next placed in a steam jacketed, glasslined reactor equipped with a mechanical agitator and 2 liters of deionized water, then added with agitation to form a uniform suspension of the phosphor powder at room temperature. One liter of 15% sodium hypochlorite solution in water was then added with agitation to the reactor and the contents slowly heated to a temperature of approximately 80°C–90°C in order to carry out the conversion step. The reactor contents were held at this temperature range for approximately 1 hour in order to complete the conversion reaction whereupon heating and agitation were discontinued and the phosphor solids allowed to settle to the bottom of the reaction vessel for an additional 1 hour period. The supernatant liquid in the reaction mixture was thereafter decanted from the reaction vessel and the phosphor solids were then washed with additional quantities of deionized water at 80°C–90°C while being agitated to further assist in effecting the solids separation. The phosphor solids could also have been removed from the reaction vessel during this washing treatment and centrifuged with deionized water until the wash water was free of residual chloride ion.

The phosphor solids were next reslurried in the same reaction vessel with a previously prepared, saturated ammonium chloride solution in water. The partially soluble oxygen compounds which still remained in the phosphor solids were completely solubilized in this manner by reaction with ammonium chloride to form the ammonium complex products. A suitable reaction medium for this purpose contained 2 liters of deionized water along with 1 kilo of the still contaminated phosphor solids and 0.60 kilo of reagent grade ammonium chloride. This mixture was agitated for approximately one-half hour at room temperature and the phosphor solids thereafter were allowed to settle whereupon the supernatant liquid now contained the fully dissolved ammonium complex products. Final physical separation of the fully reclaimed phosphor was accomplished by conventional means.

Alternately, a saturated ammonium chloride solution can be added to a prepared slurry of the phosphor in deionized water and the solubilization effected in a comparable manner. After removal of the supernatant liquid containing the dissolved ammonium complex products from the reaction vessel, there can also be a repetition of the previously described washing steps in order to free the phosphor solids from any residual chloride ion content. The fully reclaimed phosphor product is also generally dried in an air circulating oven held at 450°C–500°C for an hour or dried at lower temperatures for longer time periods. Sifting of the reclaimed phosphor through a 325 stainless steel screen provides a powder substantially equivalent to the original material.

EXAMPLE II

A modification of the above described process is described to illustrate the optional preliminary dispersion of a contaminated phosphor to remove extraneous contamination from glass chips and the like. The phosphor was uniformly dispersed into a stainless steel tank equipped with a high-speed mixer and containing sufficient deionized water to effect a dispersion. Agitation was continued until the added phosphor had been uniformly dispersed whereupon the mixing was continued and the phosphor sieved and then centrifuged after removal from the steel tank. The centrifuge cake was thereafter processed in the same manner described in the preceding example.

It will be apparent from the foregoing description of preferred embodiments that further modification of the present process can be caarried out. For example, other soluble hypochlorites and ammonium complexing agents can be substituted with comparable results so long as known adjustments are made for conversion and solubilization of the sulfide phosphor contaminants. Likewise, the reaction conditions of such liquid treatment can be varied so long as the formation of insoluble products is avoided. It is intended to limit the present invention, therefore, only to the scope of the following claims.

What we claim as new and desire to secure by Letters Patent of the United States is:

1. A reclamation process for contaminated rare-earth phosphors to remove zinc sulfide and zinc cadmium sulfide phosphor contaminants which comprises:
   a. heating a contaminated europium activated rare-earth phosphor in an oxidizing atmosphere at elevated temperatures in the range between about 300°C and 900°C sufficiently to volatilize the organic binder which is present,
   b. slurrying the phosphor in a liquid solution of a soluble hypochlorite compound to convert the sulfide phosphor contaminants to partially soluble oxygen compounds,
   c. reacting the partially soluble oxygen compounds with a soluble ammonium compound to completely dissolve said partially soluble oxygen compounds as ammonium complex ions, and
   d. physically separating the phosphor from the dissolved products.

2. A reclamation process for contaminated rare-earth phosphors to remove zinc sulfide and zinc cadmium sulfide phosphor contaminants which comprises:
   a. heating a contaminated europium activated rare-earth phosphor in an oxidizing atmosphere at elevated temperatures in the range between about 300°C and 900°C sufficiently to volatilize the organic binder which is present,
   b. slurrying the phosphor in a heated liquid solution of a soluble hypochlorite compound at a temperature not exceeding about 90°C to convert the sulfide phosphor contaminants to partially soluble oxygen compounds.
   c. cooling the slurry sufficiently to preclude insolubilization of the partially soluble oxygen compounds,
   d. reacting the partially soluble oxygen compounds with a liquid solution of a soluble ammonium compound to completely dissolve said partially soluble oxygen compounds as ammonium complex ions, and
   e. physically separating the phosphor from the dissolved products.

3. A reclamation process for contaminated rare-earth phosphors to remove zinc sulfide and zinc cadmium sulfide phosphor contaminants which comprises:
   a. heating a contaminated europium activated rare-earth phosphor in an oxidizing atmosphere to a temperature in the range between about 300°C and 550°C to volatilize the organic binder which is present,
   slurrying the phosphor in a heated liquid solution of a soluble hypochlorite compound at a temperature not exceeding about 90°C to convert the sulfide contaminants to partially soluble oxygen compounds,
   c. separating the phosphor from the liquid solution of the hypochlorite compound,
   d. reslurrying the phosphor in a solution of a soluble ammonium compound to completely dissolve the partially soluble oxygen compounds as ammonium complex ions, and
   e. separating the phosphor from the dissolved oxygen compounds.

4. A process as in claim 3 wherein the soluble hypochlorite compound is sodium hypochlorite.

5. A process as in claim 4 wherein the soluble ammonium compound is ammonium chloride.

6. A process as in claim 3 wherein prior to (a) the contaminated phosphor is dispersed in a liquid solvent for the organic binder which is present and then separated from said liquid.

7. A reclamation process for contaminated rare-earth phosphors to remove zinc sulfide and zinc cadmium sulfide phosphor contaminants which comprises:
   a. heating a contaminated europium activated rare-earth phosphor in air to a temperature in the range between about 450°C and 550°C to volatilize the organic binder which is present, b. slurrying the phosphor in water at a temperature not exceeding about 90°C and adding an aqueous solution of a soluble hypochlorite compound in sufficient amount to convert the sulfide phosphor contaminants to partially soluble oxygen compounds,
c. separating the phosphor from the liquid solution and reslurrying the phosphor in water for removal of residual chloride ion,
d. separating the phosphor and reslurrying the separated phosphor in a saturated aqueous solution of a soluble ammonium compound to completely dissolve the partially soluble oxygen compounds as ammonium complex ions.

e. separating the phosphor from the dissolved oxygen compounds and reslurrying the phosphor in water for removal of residual chloride ion, and
f. drying the decontaminated phosphor.

8. A process as in claim 7 wherein the soluble hypochlorite compound is sodium hypochlorite.

9. A process as in claim 8 wherein the soluble ammonium compound is ammonium chloride.

10. A process as in claim 7 wherein prior to (a) the contaminated phosphor is dispersed in water, and then separated therefrom.

* * * * *